(12) United States Patent
Hirooka et al.

(10) Patent No.: US 10,920,163 B2
(45) Date of Patent: Feb. 16, 2021

(54) GREASE COMPOSITION FOR LUBRICATING RESINS AND ELECTRIC POWER STEERING DEVICE

(71) Applicants: KYODO YUSHI CO., LTD., Fujisawa (JP); NSK Ltd., Tokyo (JP)

(72) Inventors: Iwaki Hirooka, Fujisawa (JP); Haruhiko Kiyota, Maebashi (JP); Takeshi Yamamoto, Maebashi (JP); Michita Hokao, Fujisawa (JP)

(73) Assignees: KYODO YUSHI CO., LTD., Fujisawa (JP); NSK LTD., Tokyo (JP)

( * ) Notice: Subject to any disclaimer, the term of this patent is extended or adjusted under 35 U.S.C. 154(b) by 0 days.

(21) Appl. No.: 15/539,474

(22) PCT Filed: Dec. 28, 2015

(86) PCT No.: PCT/JP2015/086535
§ 371 (c)(1),
(2) Date: Jun. 23, 2017

(87) PCT Pub. No.: WO2016/104812
PCT Pub. Date: Jun. 30, 2016

(65) Prior Publication Data
US 2017/0362530 A1   Dec. 21, 2017

(30) Foreign Application Priority Data

Dec. 26, 2014   (JP) .................. JP2014-266288

(51) Int. Cl.
*C10M 157/00* (2006.01)
*C10M 173/02* (2006.01)
(Continued)

(52) U.S. Cl.
CPC ......... *C10M 143/04* (2013.01); *B62D 5/0409* (2013.01); *C10M 105/04* (2013.01);
(Continued)

(58) Field of Classification Search
CPC ......... C10M 2215/102; C10M 115/08; C10M 119/02; C10M 119/06; C10M 169/06;
(Continued)

(56) References Cited

U.S. PATENT DOCUMENTS

2006/0117889 A1  6/2006  Segawa et al.
2006/0154831 A1  7/2006  Iwano
(Continued)

FOREIGN PATENT DOCUMENTS

JP   58-22336       2/1982
JP   2002-363588 A  12/2002
(Continued)

OTHER PUBLICATIONS

International Search Report (PCT/ISA/210) dated Mar. 1, 2016, by the Japanese Patent Office as the International Searching Authority for International Application No. PCT/JP2015/086535.
(Continued)

*Primary Examiner* — Prem C Singh
*Assistant Examiner* — Francis C Campanell
(74) *Attorney, Agent, or Firm* — Buchanan, Ingersoll & Rooney PC

(57) ABSTRACT

The invention provides a grease composition for lubricating resins which contains a base oil, a diurea compound represented by formula (I) as a thickener: $R^1$—NHCONH—$R^2$—NHCONH—$R^3$ (I) (wherein $R^2$ represents a bivalent aromatic hydrocarbon group having 6 to 15 carbon atoms, and $R^1$ and $R^3$ each independently represent a straight-chain or branched alkyl group having 8 to 22 carbon atoms), and a chained hydrocarbon polymer having a weight-average molecular weight of 20,000 to 300,000.

9 Claims, 5 Drawing Sheets

(51) Int. Cl.

| | | |
|---|---|---|
| *C10M 143/04* | (2006.01) | |
| *C10M 169/06* | (2006.01) | |
| *F16H 1/16* | (2006.01) | |
| *F16H 57/12* | (2006.01) | |
| *F16H 55/56* | (2006.01) | |
| *C10M 143/00* | (2006.01) | |
| *C10M 115/08* | (2006.01) | |
| *B62D 5/04* | (2006.01) | |
| *C10M 105/04* | (2006.01) | |
| *C10M 143/12* | (2006.01) | |
| *F16H 55/22* | (2006.01) | |
| *F16H 57/04* | (2010.01) | |
| *F16H 55/24* | (2006.01) | |
| *C10N 10/02* | (2006.01) | |
| *C10N 10/12* | (2006.01) | |
| *C10N 20/04* | (2006.01) | |
| *C10N 30/06* | (2006.01) | |
| *C10N 30/00* | (2006.01) | |
| *C10N 40/04* | (2006.01) | |
| *C10N 40/06* | (2006.01) | |
| *C10N 50/10* | (2006.01) | |

(52) U.S. Cl.
CPC ........ *C10M 115/08* (2013.01); *C10M 143/00* (2013.01); *C10M 143/12* (2013.01); *C10M 169/06* (2013.01); *F16H 1/16* (2013.01); *F16H 55/22* (2013.01); *F16H 55/566* (2013.01); *F16H 57/0464* (2013.01); *F16H 57/0498* (2013.01); *F16H 57/12* (2013.01); C10M 2203/024 (2013.01); C10M 2205/02 (2013.01); C10M 2205/022 (2013.01); C10M 2205/024 (2013.01); C10M 2205/028 (2013.01); C10M 2205/0285 (2013.01); C10M 2205/04 (2013.01); C10M 2205/06 (2013.01); C10M 2205/14 (2013.01); C10M 2205/18 (2013.01); C10M 2207/1256 (2013.01); C10M 2207/1265 (2013.01); C10M 2207/1285 (2013.01); C10M 2215/064 (2013.01); C10M 2215/1026 (2013.01); C10M 2219/044 (2013.01); C10M 2219/068 (2013.01); C10N 2010/02 (2013.01); C10N 2010/12 (2013.01); C10N 2020/04 (2013.01); C10N 2030/06 (2013.01); C10N 2030/74 (2020.05); C10N 2040/04 (2013.01); C10N 2040/06 (2013.01); C10N 2050/10 (2013.01); *F16H 55/24* (2013.01)

(58) Field of Classification Search
CPC ........ C10M 143/00; C10M 2205/0285; C10M 2205/04; C10M 2207/1256; C10M 2203/024; C10M 2205/02; C10M 2205/024; C10M 2205/06; C10M 2215/1026; F16H 57/0464; F16H 57/0498; F16H 1/16; F16H 55/24; C10N 2040/04; C10N 2040/06; C10N 2050/10
USPC .................................................. 508/473, 528
See application file for complete search history.

(56) References Cited

U.S. PATENT DOCUMENTS

| | | | |
|---|---|---|---|
| 2007/0149422 A1* | 6/2007 | Miyajima ............ | C10M 159/06 508/451 |
| 2007/0251757 A1 | 11/2007 | Segawa et al. | |
| 2007/0251758 A1 | 11/2007 | Segawa et al. | |
| 2008/0168854 A1 | 7/2008 | Iwano | |
| 2008/0194441 A1 | 8/2008 | Kawata et al. | |
| 2009/0270290 A1 | 10/2009 | Sawaguchi et al. | |
| 2010/0197541 A1* | 8/2010 | Li Pi Shan ........... | C08F 295/00 508/591 |
| 2014/0000401 A1 | 1/2014 | Kunishima et al. | |

FOREIGN PATENT DOCUMENTS

| | | |
|---|---|---|
| JP | 2003-65422 A | 3/2003 |
| JP | 2003-118006 | 4/2003 |
| JP | 2003-207031 A | 7/2003 |
| JP | 2003-246996 A | 9/2003 |
| JP | 2004-231714 A | 8/2004 |
| JP | 2005-42913 | 2/2005 |
| JP | 2005-329849 A | 12/2005 |
| JP | 2006-328308 A | 12/2006 |
| JP | 4037067 | 1/2008 |
| JP | 2008-101122 A | 5/2008 |
| JP | 2008-214606 A | 9/2008 |
| JP | 2009-114387 A | 5/2009 |
| JP | 2010-126607 A | 6/2010 |
| JP | 4566909 | 10/2010 |
| JP | 2014-9789 A | 1/2014 |
| WO | WO 2004/037958 A1 | 5/2004 |
| WO | WO 2004/081156 A1 | 9/2004 |
| WO | WO 2006/011534 A | 2/2006 |

OTHER PUBLICATIONS

Written Opinion (PCT/ISA/237) dated Mar. 1, 2016, by the Japanese Patent Office as the International Searching Authority for International Application No. PCT/JP2015/086535.
Office Action (Notice of Reasons for Refusal) dated Jun. 15, 2020, by the Japanese Patent Office in corresponding Japanese Patent Application No. 2016-566584 and an English Translation of the Office Action. (11 pages).

* cited by examiner

Tooth profile direction

Tooth surface roughness (Ra) of worm wheel: 0.5 μm (a)

Tooth surface roughness (Ra) of worm wheel: 1.2 μm (b)

Tooth surface roughness (Ra) of worm wheel: 1.5 μm (c)

Tooth surface roughness (Ra) of worm: 0.05 μm (a)

Tooth surface roughness (Ra) of worm: 0.11 μm (b)

Tooth surface roughness (Ra) of worm: 0.22 μm (c)

GREASE COMPOSITION FOR LUBRICATING RESINS AND ELECTRIC POWER STEERING DEVICE

TECHNICAL FIELD

The present invention relates to a grease composition for lubricating resins. More particularly, the invention relates to a grease composition suitable for lubrication between the resin members, and also between the resin member and the member made of other materials such as a metal or the like.

BACKGROUND ART

Recently, a variety of metallic members have been increasingly replaced by resin (e.g., polyamide-made) members to reduce the weight of a motorcar or the like. For example, the speed reduction mechanism of the electric power steering (EPS) device in the automobiles employs a worm wheel gear made of resin and a worm made of steel. Grease compositions are commonly used for lubrication between the resin members and also between the resin member and the metallic member.

The normal driving operation is assisted by the EPS, while the expressway driving with a slight steering angle or the return from the maximum steering wheel angle to the neutral position is not assisted by the EPS. The operation not assisted by the EPS, which is carried out at a lower speed and under a lower load when compared with the normal driving operation, is required to achieve the low friction characteristics under the conditions more moderate than those of the normal operation.

A grease composition for lubricating resins characterized by adding montan wax to a base grease comprising a thickener and a base oil is reported as the grease composition for lubricating resins applicable to the EPS reduction gear for automobiles. It is considered that the above-mentioned grease composition is capable of lowering the static coefficient of friction on the portion to be lubricated and extending the service life of the lubricated portion (as shown in JP 4037067, for example).

Another grease composition for lubricating resins applicable to the EPS reduction gear for automobiles is proposed, which is characterized by comprising a polyolefin wax and a wax from montanic acid derivatives. It is reported that this grease composition is capable of maintaining good sliding lubrication between the resin member and the metal member, and between the metal members for an extended period of time, to improve the durability of the expandable shaft for automobile steering and the electric power steering device and lengthen the life thereof (as shown in JP 4566909, for example).

The gear provided with a large backlash generates a rattling noise when a vibration load is input from the wheel side to the steering shaft. To reduce such a rattling noise, there is reported a reduction gear mechanism, which is provided with a means for urging a driving gear (worm) toward a driven gear (worm wheel) to decrease the backlash (as shown in JP 2005-42913 A, for example).

There is a report of EPS where a wheel gear of the reduction gear is made of a fiber-reinforced resin and has a tooth surface roughness (Ra) of 0.1 μm or more and 0.5 μm or less (as shown in JP 2014-9789 A, for example).

SUMMARY OF INVENTION

Technical Problem

There is still an increasing demand for a grease composition having improved low friction characteristics under the conditions of a low speed and a low load during the operation not assisted by EPS.

To attain the low friction properties under the conditions of a low speed and a low load during the operation not assisted by EPS, an object of the invention is to provide a grease composition capable of reducing the steering torque during the operation not assisted by EPS.

Another object is to provide a reduction gear mechanism capable of retaining a grease composition on the surface of a resin worm wheel, i.e., a driven gear of the speed reduction gear for the EPS to improve the durability by increasing the tooth surface roughness.

A further object of the invention is to provide an electric power steering device using the above-mentioned reduction gear mechanism.

Solution to Problem

To solve the above-mentioned problems, the inventors of the present invention have found that the addition of a particular polymer to a urea grease can reduce the steering torque during the operation not assisted by EPS.

Namely, the invention provides a grease composition shown below:

[1] A grease composition for lubricating resins, comprising;
a base oil,
as a thickener, a diurea compound represented by the following formula (I):

$$R^1\text{—NHCONH—}R^2\text{—NHCONH—}R^3 \quad (I)$$

wherein $R^2$ represents a bivalent aromatic hydrocarbon group having 6 to 15 carbon atoms, and $R^1$ and $R^3$ each independently represent a straight-chain or branched alkyl group having 8 to 22 carbon atoms, and
a chained hydrocarbon polymer having a weight-average molecular weight of 20,000 to 300,000.

[2] The grease composition for lubricating resins, described in the above-mentioned item [1], wherein the hydrocarbon polymer is contained in an amount of 0.1 to 30 mass % based on the total mass of the composition.

[3] The grease composition for lubricating resins, described in the above-mentioned item [1] or [2], wherein the base oil comprises a poly-α-olefin.

[4] The grease composition for lubricating resins, described in any one of the above-mentioned items [1] to [3], further comprising a wax consisting of a polyolefin wax and a montan wax, with the content of the polyolefin wax being 3 mass % or more based on the total mass of the composition, the content of the montan wax being 2 mass % or more based on the total mass of the composition, and the sum of the polyolefin wax and the montan wax being 10 mass % or less based on the total mass of the composition.

[5] The grease composition for lubricating resins, described in any one of the above-mentioned items [1] to [4], which is used for lubricating between a resin member and a metal member.

[6] The grease composition for lubricating resins, described in the above-mentioned items [5], wherein the lubrication between the resin member and the metal member is a rolling-sliding lubrication.

[7] A reduction gear mechanism designed as a power transmission mechanism for transmitting an output torque of a motor to a shaft as an assist torque, comprising a driving gear made of a metal and connected to the motor and a driven gear made of a resin composition, wherein the driven gear has a tooth surface roughness of 0.5 μm or more in terms of the arithmetic mean roughness (Ra) and the metal driving gear and the resin driven gear are lubricated with the grease composition described in the above-mentioned item [6].

[8] The reduction gear mechanism described in the above-mentioned item [7], wherein tooth surfaces of the metal driving gear are brought into contact with tooth surface of the resin driven gear on one side facing a transmission direction of rotation and on the other side facing a direction opposite to the transmission direction of rotation.

[9] An electric power steering device which uses the reduction gear mechanism described in the above-mentioned item [8].

Effects of Invention

The invention can provide a grease composition capable of reducing the steering torque during the operation not assisted by EPS. The grease composition of the invention also exhibits excellent heat resistance.

In the reduction gear mechanism according to the invention, a material of the driven gear is designed to have a relatively high surface roughness of 0.5 μm or more in terms of the arithmetic mean roughness (Ra) to retain a grease composition on the tooth surfaces, thereby reducing the friction coefficient and improving the lubricating properties under a wide range of conditions (ranging from a low to high load, and from a low to high speed).

DESCRIPTION OF EMBODIMENTS

Figure 1:
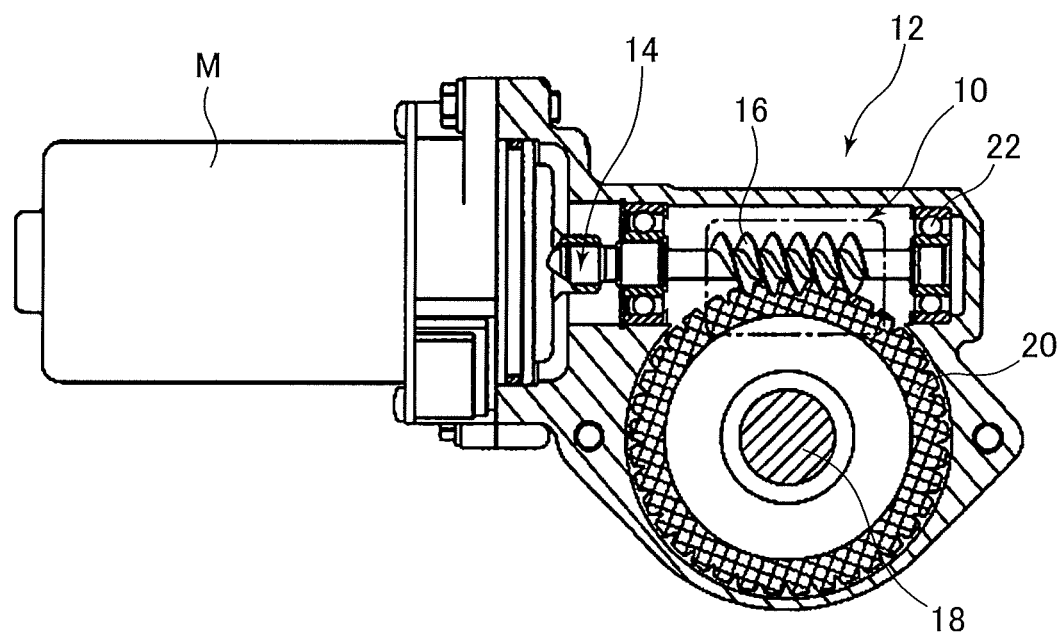
FIG. 1 is a view showing a reduction gear mechanism that is a worm gear composed of a worm and a worm wheel.

Unless otherwise specified, the percentage (%) herein used means percent by mass. The numerical range herein indicated by "a-b" means a range including both limits a and b.

[Base Oil]

The base oil that can be used for the grease composition of the invention is not particularly limited. Mineral oils and synthetic oils are usable. The base oil may be used alone or in combination with two or more base oils.

The mineral oil may be selected from paraffinic mineral oils, naphthenic mineral oils, and the mixtures thereof.

The synthetic oil may be selected from a variety of synthetic oils, for example, synthetic ester oils such as diesters or polyol esters; synthetic hydrocarbon oils such as poly-α-olefin (PAO) or polybutene; synthetic ether oils such as alkyldiphenyl ethers or polypropylene glycol; silicone oils; fluorinated oils, or the like.

Preferably, the base oil may comprise a poly-α-olefin. When the base oil comprises a base oil other than a poly-α-olefin, the poly-α-olefin may preferably be contained in an amount of 50 mass % or more, more preferably 80 mass % or more, and most preferably 100 mass %, based on the total mass of the base oil. The base oil may preferably be a synthetic oil, and in particular, a synthetic hydrocarbon oil.

The kinematic viscosity of the base oil used in the invention is not particularly limited, but may preferably be in the range of 10 to 300 mm$^2$/s, more preferably 15 to 250 mm$^2$/s, and most preferably 15 to 200 mm$^2$/s at 40° C. The kinematic viscosity at 40° C. of the base oil herein used can be determined in accordance with the JIS K 2220 23.

The content of the base oil may preferably be in the range of 50 to 95 mass %, and more preferably 60 to 90 mass % in the grease composition of the invention.

<Thickener>

The thickener used for the grease composition of the invention comprises a diurea compound represented by the above-mentioned formula (I).

In the formula (I), $R^2$ represents a bivalent aromatic hydrocarbon group having 6 to 15 carbon atoms, and $R^1$ and $R^3$, which may be the same or different from each other, represent a straight-chain or branched alkyl group having 8 to 22 carbon atoms.

$R^2$ may preferably be a group derived from tolylene diisocyanate or diphenylmethane-4,4'-diisocyanate, and more preferably be a group derived from diphenylmethane-4,4'-diisocyanate.

$R^1$ and $R^3$, which may be the same or different from each other, represent a straight-chain or branched alkyl group having 8 to 22 carbon atoms, preferably a straight-chain alkyl group having 8 to 20 carbon atoms, and more preferably a straight-chain alkyl group having 8 or 18 carbon atoms.

A diurea compound of formula (I) where $R^2$ is a group derived from diphenylmethane-4,4'-diisocyanate is preferable.

A diurea compound of formula (I) where $R^2$ is a group derived from diphenylmethane-4,4'-diisocyanate, and $R^1$ and $R^3$, which may be the same or different from each other, is a straight-chain alkyl group having 8 or 18 carbon atoms is particularly preferable.

For example, the diurea compound represented by formula (I) can be obtained by reacting a predetermined diisocyanate with a predetermined aliphatic monoamine in the base oil. Preferable specific examples of the diisocyanate include diphenylmethane-4,4'-diisocyanate and tolylene diisocyanate. Specific examples of the aliphatic monoamine include octylamine, nonylamine, decylamine, undecylamine, dodecylamine, tridecylamine, tetradecylamine, pentadecylamine, hexadecylamine, heptadecylamine, octadecylamine, nonyldecylamine, eicodecylamine, or the like. The diurea compound that can be obtained by reacting diphenylmethane-4,4'-diisocyanate with octylamine and octadecylamine is most preferable.

Although it is most preferable that the diurea compound of formula (I) be used as a single thickener for the grease composition according to the invention, other thickeners may be added in an amount of preferably 15 mass % or less, more preferably 10 mass % or less, with respect to the total mass of the thickeners. Examples of other thickeners include soap thickeners such as lithium soap, lithium complex soap or the like; urea thickeners such as diurea or the like; inorganic thickeners such as organoclay or the like; and organic thickeners such as polytetrafluoroethylene (PTFE) or the like. Among those thickeners, the soap thickener is preferable, and Li soap is more preferable, and in particular, lithium 12-hydroxystearate is most preferable.

The content of the thickener in the grease composition of the invention varies depending on the structure of the thickener. The grease composition of the invention may have a consistency of preferably 200 to 400, and the content of the thickener may be such an amount that is necessary to obtain the above-mentioned consistency. When the thickener consists of the diurea compound of formula (I), the content of the thickener may be typically in the range of 3 to 30 mass %, preferably 5 to 25 mass %, based on the total mass of the grease composition. When the additional thickener is used, the content of the additional thickener is smaller than that of the diurea compound of formula (I).

<Chained Hydrocarbon Polymer>

The grease composition of the invention comprises a chained hydrocarbon polymer as an additive. The chained hydrocarbon polymer used in the invention may be substituted with a cyclic group such as an alicyclic group, an aromatic ring or the like. However, the unsubstituted chained hydrocarbon polymer is preferred. Examples of the chained hydrocarbon polymer used in the invention include unsubstituted or substituted olefin copolymers, unsubstituted or substituted ethylene propylene copolymers, unsubstituted or substituted polyisoprenes, or the like. Among the above polymers, the unsubstituted or substituted olefin copolymers are preferred, and in particular, the unsubstituted olefin copolymers are most preferable.

The chained hydrocarbon polymer used in the invention has a weight-average molecular weight of 20,000 to 300,000, preferably 50,000 to 300,000, and more preferably 200,000 to 300,000, and most preferably 200,000 to 250,000. The weight-average molecular weight herein used is a value determined in terms of standard polystyrene by gel permeation chromatography (GPC).

Through an infrared spectroscopic analysis, it can be confirmed that the hydrocarbon polymer used in the invention does not contain an aromatic ring.

Addition of the above-mentioned additive makes it possible to form a thick oil film on the portion where lubrication is needed although formation of the oil film is difficult, especially when the operating speed is within a low speed region. This can prevent direct contact of the resin member with another resin member or the metal member, thereby reducing the friction torque. The mechanism of forming a thicker oil film due to the addition of such a predetermined additive even when the speed is within a low speed region is considered that the equivalent viscosity of the resultant grease becomes much higher in the first Newtonian viscosity region even if the speed is within a low speed region, i.e., the entraining speed is insufficient, so that a thick elasto-hydrodynamic lubrication (EHL) film can be formed.

The chained hydrocarbon polymer used in the invention is defined as a polymer that is soluble in the base oil, and does not precipitate in the base oil after the temperature is returned to room temperature (25° C.) once dissolved in the base oil, for example, with stirring at elevated temperatures. In contrast to this, wax is defined as a substance that is a solid state at room temperature (25° C.) and precipitates in the base oil after dissolved in the base oil at elevated temperatures and then cooled to room temperature (25° C.).

The chained hydrocarbon polymer may preferably be contained in an amount of 0.1 to 30 mass %, more preferably 0.1 to 20 mass %, still more preferably 0.1 to 10 mass %, and most preferably 0.1 to 4 mass %, based on the total mass of the grease composition of the invention.

The kinematic viscosity of a mixture of the base oil and the chained hydrocarbon polymer is not particularly limited, and may preferably be in the range of 10 to 300 mm$^2$/s, more preferably 50 to 280 mm$^2$/s, and most preferably 80 to 280 mm$^2$/s at 40° C.

<Other Additives>

When necessary, the grease composition of the invention may further comprise any additives that are typically used in the grease. The contents of those additives may be generally 0.5 to 35 mass %, and preferably 5 to 25 mass %, based on the total mass of the grease composition. Such additives may include a wax, antioxidant, inorganic passivator, rust preventive, metallic corrosion inhibitor, oiliness improver, antiwear agent, extreme pressure agent, solid lubricant or the like. Advantageously, the grease composition may further comprise the wax, and more advantageously, the grease composition may further comprise the antioxidant and the rust preventive in addition to the wax.

<Wax>

The wax that can be used in the invention consists of a polyolefin wax such as polyethylene wax or the like, and a montan wax.

The polyolefin waxes include a petroleum wax that is separated in the process of oil refining, having no polar group in the wax components; Fischer-Tropsch wax synthesized by reacting carbon monoxide with hydrogen; polyethylene wax produced by polymerization of ethylene and pyrolysis of polyethylene, or the like.

The polyethylene wax may have a weight-average molecular weight of about 1,000 to about 20,000. There are the high-density polyethylene wax with a density of 0.96 or more, the medium-density polyethylene wax with a density ranging from 0.94 to 0.95 and the low-density polyethylene wax with a density of 0.93 or less. The high-density polyethylene wax is characterized by high melting point, high softening point and high crystallinity, and high degree of hardness; while the low-density polyethylene wax has low melting point and low softening point and exhibits soft properties. From the viewpoint of heat resistance, the dropping point of the polyethylene wax may preferably be 100° C. or more, and more preferably 120° C. or more. The dropping point can be determined in accordance with DIN51801.

Specific examples of the commercially available polyethylene wax include Hi-WAX 200P, Hi-WAX 210P and Hi-WAX NL200 (made by Mitsui Chemicals, Inc.); and Licowax PE520, Licowax PE190 and Licowax PE130 (made by Clariant Japan K. K.). Specific examples of the commercially available polypropylene wax include Hi-WAX NP105 (made by Mitsui Chemicals, Inc.) and Ceridust 6050M (made by Clariant Japan K. K.) or the like.

The montan wax, which belongs to one of the mineral waxes, comprises a long-chain ester as the main component, free higher alcohol, resin, sulfur-containing compound or the like. Examples of the montan wax include acid waxes having an acid value of 110 to 160 mgKOH/g; ester waxes having both a non-polar portion and a polar portion; partially saponified ester waxes containing a mixture of the esterified product of montanic acid and the saponified product of the above esterified product with calcium hydroxide; saponified waxes of sodium salt and calcium salt of montanic acid; ethylene oxide added montan waxes, or the like. The acid value can be determined in accordance with DIN53402.

Specific examples of the commercially available montan wax include Licowax OP Flakes, Licowax S, and Licolub WE40 (made by Clariant Japan K. K.) or the like.

When the grease composition of the invention comprises a wax, the wax consisting of the polyethylene wax and the montan wax is particularly preferable.

When the grease composition of the invention comprises the wax consisting of the polyolefin wax and the montan wax, it is particularly preferable that the content of the polyolefin wax be 3 mass % or more and the content of the montan wax be 2 mass % or more, based on the total mass of the composition, and the sum of the polyolefin wax and the montan wax be 10 mass % or less based on the total mass of the composition.

Examples of the antioxidant include amine-based antioxidants such as phenyl α-naphthylamine, alkylated phenyl α-naphthylamine, alkyldiphenylamine or the like; and phenol-based antioxidants such as hindered phenols including 2,6-di-tert-butyl-p-cresol, pentaerythrityl.tetrakis [3-(3,5-di-t-butyl-4-hydroxyphenyl)-propionate], octadecyl-3-(3,5-di-t-butyl-4-hydroxyphenyl)propionate or the like. The amine-based antioxidants are preferred, and alkyldiphenylamine is particularly preferable.

The inorganic passivator such as sodium nitrite or the like can be used.

Examples of the rust preventive include organic sulfonate rust preventives such as Ca, Ba, Zn and Na salts of organic sulfonic acid or the like; succinic acid rust preventives such as alkenylsuccinic anhydride, alkenylsuccinate, half ester of alkenylsuccinic acid or the like; amine salts of fatty acids, dibasic acids, naphthenic acids, lanolin fatty acids, alkenylsuccinic acids or the like; and carboxylate rust preventives such as Na, K and Zn salts of aliphatic dicarboxylic acids such as sebacic acid, undecanedioic acid, dodecanedioic acid, brassylic acid, tetradecanedioic acid or the like and naphthenic acids. Of those rust preventives, the organic sulfonate rust preventives are preferred, and Ca sulfonate is particularly preferable.

The metallic corrosion inhibitor such as benzotriazole or the like can be used.

Examples of the oiliness improver include fatty acids, fatty acid esters, phosphates or the like.

As the antiwear agent or extreme-pressure agent, tricresyl phosphate, tri-2-ethylhexylphosphate; dibenzyl disulfide, a variety of polysulfides; triphenylphosphorothionate; Mo, Sb and Bi salts of dialkyldithiophosphoric acid, Mo, Zn, Sb, Ni, Cu and Bi salts of dialkyldithiocarbamic acid or the like; ash-free dithiocarbamate, ash-free dithiophosphate carbamate can be used.

Examples of the solid lubricant include metallic oxides such as CaO, ZnO, MgO or the like; metal carbonates such as $CaCO_3$, $ZnCO_3$ or the like; molybdenum disulfide, graphite, PTFE, MCA or the like.

<Worked Penetration>

The worked penetration of the grease composition according to the invention may preferably be in the range of preferably 200 to 400, more preferably 250 to 350, and most preferably 300 to 350.

<Traction Coefficient>

The grease composition of the invention may preferably show a traction coefficient of preferably 0.017 or less, more preferably 0.016 or less. When the traction coefficient is within the above-mentioned range, the steering torque can be fully reduced in the operation not assisted by EPS.

Examples of the resin to be lubricated with the grease composition for lubricating resins according to the invention include polyamide resin, polycarbonate, polyamide-imide resin, polyacetal resin, polybutylene terephthalate resin, polyether ether ketone resin, polyphenylene sulfide resin, or the like.

The metals that can be lubricated with the grease composition for lubricating resins according to the invention include steel or the like.

Advantageously, the grease composition for lubricating resins according to the invention can be used for sliding lubrication, in particular, rolling-sliding lubrication between a member made of a resin, particular polyamide, and a member made of a metal, particularly steel.

The grease composition for lubricating resins according to the invention is suitable for lubrication of the electric power steering device, electrically adjustable tilt and telescopic, and resin-coated spline, and the male and female shafts of the telescopic shaft for motor vehicle steering.

<First Embodiment of Reduction Gear Mechanism>

The first embodiment of a reduction gear mechanism according to the invention will now be explained by referring to the figures.

Figure 2:
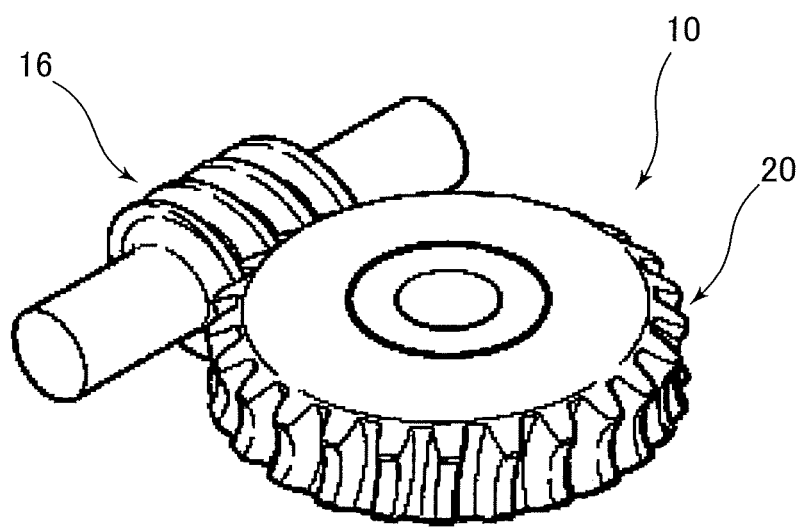
FIG. 2 is a view showing an engaged portion of the gears of the worm and the worm wheel.

FIG. 1 is a partially broken side view of an electric power steering (EPS) mechanism 12 where a reduction gear 10 according to the first embodiment of the invention is incorporated. FIG. 2 is a perspective view of the reduction gear 10 according to the first embodiment of the invention.

Basically, the EPS mechanism 12 has the structure comprising a motor M, a worm 16 connected to an output shaft 14 of the motor M, and a worm wheel 20 that is fitted on a steering shaft 18 and designed to mesh with the worm 16, as shown in FIGS. 1 and 2. This basic structure is the same as that of the conventional EPS. Rotation of the steering shaft 18 is assisted by the torque of the motor M in the EPS mechanism 12 in the same manner as in the conventional EPS mechanism.

In the EPS mechanism 12, the output shaft of the motor M and the worm 16 are connected via a spline or an elastic coupling (not shown). The shaft of the worm 16 and the shaft of the worm wheel 20 are each supported by the rolling bearings such as deep-groove ball bearings, four-point contact ball bearings or the like.

In the EPS mechanism 12 according to this embodiment, the worm 16 that is connected to the motor M and works as a driving gear is made of a metal; while the worm wheel 20 serving as a driven gear is formed of a resin composition. Although the core of the worm wheel 20 is made of a steel in this embodiment, the core may be formed from other materials such as resins, aluminum alloys or the like.

The worm wheel 20 according to this embodiment is produced by injection-molding of the resin over the core metal. Alternatively, as described in JP S58-22336 A or JP 2003-118006 A, the core metal and the resin portion may be incorporated in such a manner that the core metal is inserted into the cylindrically formed resin, to melt the resin by high-frequency induction heating. Further, a silane coupling agent may be added as the binder to increase the binding performance.

For the resin composition constituting the worm wheel 20, a resin not reinforced with fibers can be used, but a fiber-reinforced resin that is reinforced with fibers (e.g., glass fibers) may preferably be employed so as to withstand the transmission of higher load. Other fibers than glass fibers, for example, polyethylene fibers, carbon fibers, aramid fibers or the like can be used for reinforcement. Polyamide PA66 is used as the base material of the resin composition. PA6, PA46, PA9T, PPS, PET or the like may also be used.

In the gear cutting of the worm wheel 20, the tooth surfaces are formed by hobbing. Alternatively, an abrasive grain-coated tool may be used for gear cutting. The surface roughness of the tooth surfaces may be adjusted by breaking-in.

Figure 3:
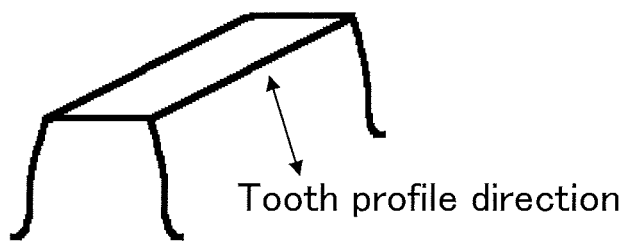
FIG. 3 is a diagram to indicate a tooth profile direction on a tooth surface of the worm wheel.

When measured in the tooth profile direction (FIG. 3), the surface roughness of the tooth surface of the worm wheel 20 is 0.5 μm or more and 1.5 μm or less in terms of the arithmetic mean roughness (Ra).

With respect to the tooth surface roughness of the worm wheel, the skewness value (Rsk) is negative when measured in the tooth profile direction. The Rsk value of −0.5 or less is more preferable.

The worm 16 is made of steel, which is hardened by heat treatment to prevent the abrasion which may be caused by contact with glass fibers contained in the worm wheel 20. The tooth surface roughness of the worm 16 is 0.05 μm or more and 0.22 μm or less in terms of the arithmetic mean roughness (Ra).

The tooth surfaces of the worm 16 are lubricated with the grease composition of the invention.

Actions and Effects

When the fiber-reinforced resin is injection-molded, the resin is first brought into contact with the mold and then cooled and solidified. The resin surface thus becomes a so-called skin layer. In general, the amount of fibers exposed on the above-mentioned skin layer, which depends on the injection molding conditions is relatively small. However, after the injection-molded blank is subjected to a gear cutting process to form the tooth surfaces on the blank, the glass fibers become exposed on the tooth surfaces, thereby increasing the surface roughness.

To keep the lubricating properties of the tooth surface for an extended period of time, fine grooves may be formed on the tooth surface. In other words, the gear may be designed so as to retain the lubricating oil on the tooth surface by forming the oil reservoirs thereon.

The processing methods for forming the above-mentioned oil reservoirs are described, for example in JP 2003-065422 A and WO 2006/011534 A. Those methods, however, may increase the roughness of the tooth surface.

Under the low-load operating conditions not assisted by EPS, the opposite surfaces are in the state of mixed lubrication where the friction coefficient is low. However, if the surface roughness of the worm wheel is high as mentioned above, the ratio of surface portions subjected to boundary lubrication becomes larger in the mixed lubrication state, which correspondingly increases the friction coefficient. The operator therefore feels some friction during the steering operation, which will affect the steering feeling.

In the state of mixed lubrication, the grease composition of the invention can act in such a manner that the hydrocarbon polymer contained in the composition forms an oil film via the base oil on the fine convex portions of the tooth surface to prevent the direct contact. Consequently, the friction coefficient can be lowered even though the surface roughness is considerable, which can reduce the feeling of friction during the steering operation.

Even when the conditions are disadvantageous to the formation of oil film, for example, a high load is applied or the temperature is high enough to lower the grease viscosity, the lubricating oil can be retained on the tooth surface to maintain the lubrication properties because numerous fine grooves are formed on the tooth surface to such an extent that can be accepted as the surface roughness.

Typically, at low temperatures, the viscosity of the base oil increases, which has a good effect on the formation of the oil film. However, the state of hydrodynamic lubrication increases a friction coefficient due to the viscous drag (viscosity resistance). The viscosity of the hydrocarbon polymer is relatively less susceptible to the low temperatures, which can prevent the friction coefficient from readily increasing at low temperatures. In light of this, the invention can solve the problem that it is required to lower the viscosity of the base oil in consideration of the operability at low temperatures although the increase of the viscosity of the base oil is desired for readily forming an oil film at room temperatures and high temperatures.

In the electric power steering mounted on the vehicles, the reduction gear according to the first embodiment can reduce the coefficient of friction and improve the steering feeling under a wide range of operating conditions of vehicles.

<Second Embodiment of Reduction Gear Mechanism>

Next, the second embodiment of a reduction gear mechanism according to the invention will be explained.

Figure 4:
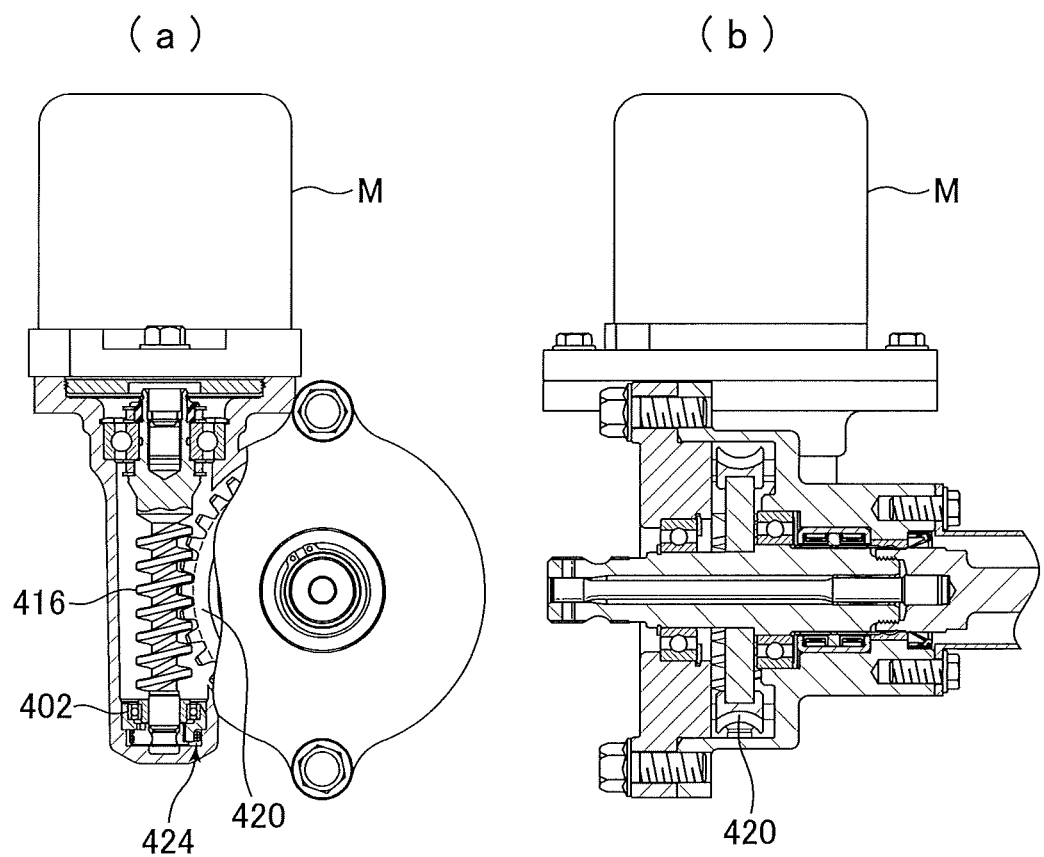
FIG. 4 includes schematic plan views showing one example of a reduction gear mechanism according to a second embodiment of the invention.

The reduction gear of the second embodiment has the same basic structure as that of the above-mentioned reduction gear of the first embodiment. Unlike the reduction gear of the first embodiment, the shaft-to-shaft distance is controlled by appropriately selecting the dimensions of the worm and the worm wheel to decrease the backlash in the reduction gear of the second embodiment. For decreasing the backlash, such a structure as shown in FIG. 4 is also available where an urging means 424 such as a spring or the like is disposed in the vicinity of a bearing 402 provided to support a worm 416, to urge the worm 416 toward a worm wheel 420.

Actions and Effects

In the reduction gear for the EPS where a large backlash is provided, only the tooth surfaces subjected to the transmission of rotation are in contact with each other. Consequently, the rotational torque becomes smaller, which brings less feeling of friction during the steering operation. On the other hand, however, the vibration load is input from the wheel into the steering shaft in the vehicle, thereby producing the gear rattling noise. This may make the people feel uncomfortable.

In light of the above, the methods for reducing the gear rattling noise by making the backlash of the reduction gear for EPS smaller are shown in JP 2005-42913 A or the like. However, in those methods, not only the front side, but also the back side of each tooth with respect to the transmission direction of rotation are brought into contact with the corresponding teeth, thereby increasing the force of friction.

Further, in the structure with a small backlash, the contact load is applied between the tooth surface of the driving gear and the tooth surface of the driven gear, thereby increasing the force of friction.

Under the low-load operating conditions not assisted by EPS, the grease composition is in the state of mixed lubrication where the friction coefficient is low. However, when the high contact load is applied between the tooth surfaces as mentioned above, the ratio of the boundary lubrication portions becomes larger in the mixed lubrication state formed by the grease composition, which will increase the friction coefficient. As a result, the feeling of friction caused in the steering operation adversely affects the steering feeling.

In the mixed lubrication state, the grease composition of the invention can act in such a manner that the hydrocarbon polymer contained in the composition can form an oil film via the base oil on the fine convex portions of the tooth surface to prevent the direct contact. It is therefore possible to prevent the coefficient of friction from increasing even though the backlash is small. As a result, the increase of the force of friction can be prevented, and good steering operability can be maintained, with the gear rattling noise being prevented.

EXAMPLES

Examples and Comparative Examples 1 to 4

Grease compositions according to Examples and Comparative Examples were prepared using the thickener, base oil, and additives shown in the following tables. To be more specific, one mole of 4',4-diphenylmethanediisocyanate was reacted with two moles of a mixture of stearylamine and octylamine (with a molar ratio of amines being 1:1) in poly α-olefin (PAO with a kinematic viscosity of 48 mm²/s at 40° C.), and the resultant mixture was heated, and then cooled. After addition of the additives, the mixture was kneaded using a three-roll mill, thereby obtaining grease compositions of Examples and Comparative Examples 1 to 4. The kinematic viscosity described in each of Examples 1 to 7 and Comparative Example 3 as shown in the tables is that of a mixture of the base oil and the polymer.

Comparative Example 5

Lithium 12-hydroxystearate was mixed and dissolved in the base oil as shown in the following table with the application of heat. The resultant mixture was cooled to obtain a base grease. The predetermined amounts of additives were mixed with the base oil, which was added to the base grease, followed by thorough stirring. The resultant mixture was kneaded using a three-roll mill to prepare a grease composition of Comparative Example 5.

In each of Examples and Comparative Examples, the amount of thickener was controlled so that the worked penetration of the resultant grease composition reached 310 (when determined after a plunger was stroked 60 times in accordance with JIS K 2220 7). The balance of the grease composition was compensated with the base oil.

The grease compositions thus prepared were evaluated in accordance with the following test methods. The results are also shown in Tables 1 and 2.

<Friction Reducing Effect in Actual Device>

Using an actual device of electric power steering (EPS), a durability test was conducted. The reduction gear was equipped with a worm wheel where gear teeth were formed from a resin portion of a polyamide resin, and a worm made of steel. Each grease composition was applied to the gear teeth. With the worm and the worm wheel being meshed with each other under the same backlash conditions, the worm wheel was driven to rotate to determine the rotational torque and evaluate the friction in the actual device.

<Determination of Traction Coefficient>

The traction coefficient of a grease film formed on a rolling contact portion was determined using a ultra-thin film thickness measuring instrument based on the optical interference technique (EHL Ultra Thin Film Measurement System, made by PCS Instruments) capable of determining the traction. The steering torque in the operation not assisted by EPS was evaluated through the traction coefficient.

The test was conducted in such a way that a steel ball with a diameter of 19.5 mm was brought into a rolling-sliding contact with a polycarbonate disc at 25° C. under a load of 5 N and the traction corresponding to the predetermined speed as shown below was measured.

<Test Conditions>
Temperature: 25° C.
Test samples: Steel ball with a diameter of 19.5 mm and a polycarbonate disc
Load: 5 N
Speed: 0.038 m/s (Speed of actual device: 0.1 m/s)
Slide ratio: 110%

In light of the sliding motion (the sliding speed with respect to the rotation of the ball), the traction in the axial direction of the ball was detected using a load cell. The ratio of the maximum traction value to the load was regarded as a maximum traction coefficient.

<Evaporation Loss>

The evaporation loss of each of the grease compositions obtained in Examples and Comparative Examples was determined by the high-temperature thin-film test. The heat resistance of each composition was thus evaluated.

Each of the grease compositions obtained in Examples and Comparative Examples was applied to the surface of a standard steel plate (SPCC-SD) with a surface roughness of 0.8 to 1.5 μm in terms of the arithmetic mean roughness (Ra) at 25° C. so as to have a grease film thickness of 1 mm. After weighing, the steel plate was placed into a thermostatic chamber of 120° C. and allowed to stand for 500 hours. After that, the plate was cooled and weighed again to determine the evaporation loss of each grease composition (in the unit of mass %). In accordance with the following criteria, the heat resistance was evaluated.

Criteria:
o: The evaporation loss was less than 5%. (Small evaporation loss)
x: The evaporation was 5% or more. (Large evaporation loss)

TABLE 1

| | | Example 1 | Example 2 | Example 3 | Example 4 | Example 5 | Example 6 | Example 7 |
|---|---|---|---|---|---|---|---|---|
| Base oil | Type | PAO | PAO | PAO | PAO | PAO | PAO | PAO |
| | Kinematic viscosity at 40° C. (mm²/s) | 261 | 143 | 80 | 187 | 269 | 82.8 | 267 |
| Thickener | Type | Aliphatic diurea | Aliphatic diurea | Aliphatic diurea | Aliphatic diurea | Aliphatic diurea | Aliphatic diurea | Aliphatic diurea |
| | Mass % | 8 | 8 | 8 | 8 | 8 | 8 | 8 |
| Polymer | Type | Olefin copolymer | Olefin copolymer | Ethylene-propylene copolymer | Ethylene-propylene copolymer | Ethylene-propylene copolymer | Ethylene-propylene copolymer | Poly-isoprene |
| | Mass % | 2.1 | 1.4 | 1.0 | 2.5 | 3.2 | 2.5 | 12.5 |
| | Weight-average molecular weight | 223,000 | 223,000 | 120,000 | 120,000 | 120,000 | 120,000 | 37,100 |
| Additives (mass %) | Wax A | 3 | 3 | 3 | 3 | 3 | 3 | 3 |
| | Wax B | 4 | 4 | 4 | 4 | 4 | 4 | 4 |
| | Anti-oxidant | 2 | 2 | 2 | 2 | 2 | 2 | — |

TABLE 1-continued

|  | | Example 1 | Example 2 | Example 3 | Example 4 | Example 5 | Example 6 | Example 7 |
|---|---|---|---|---|---|---|---|---|
| | Rust preventive | 0.5 | 0.5 | 0.5 | 0.5 | 0.5 | 0.5 | 2 |
| | Li soap | — | — | 10 | 10 | 10 | 10 | 0.5 |
| Friction reducing effect in actual system | | −23.3% | −18.5% | −6.7% | −12.0% | −19.9% | −13.1% | −11.8% |
| Traction coefficient | | 0.014 | 0.016 | 0.017 | 0.017 | 0.015 | 0.016 | 0.016 |
| Evaporation loss by high-temperature thin-film test | | ○ | ○ | ○ | ○ | ○ | ○ | ○ |

TABLE 2

|  | | Comparative Example 1 | Comparative Example 2 | Comparative Example 3 | Comparative Example 4 | Comparative Example 5 |
|---|---|---|---|---|---|---|
| Base oil | Type | PAO | PAO | PAO | PAO | PAO |
| | Kinematic viscosity at 40° C. (mm²/s) | 48 | 260 | 261 | 48 | 48 |
| Thickener | Type | Aliphatic diurea | Aliphatic diurea | Aliphatic diurea | Aliphatic diurea | Li soap |
| | mass % | 8 | 8 | 8 | 8 | 8 |
| Polymer | Type | — | — | Styrene copolymer | — | — |
| | mass % | — | — | 3.4 | — | — |
| | Weight-average molecular weight | — | — | 104,000 | — | — |
| Additives mass % | Wax A | 3 | 3 | 3 | 3 | 3 |
| | Wax B | 4 | 4 | 4 | 4 | 4 |
| | Organic molybdenum | — | — | — | 3 | — |
| | Antioxidant | 2 | 2 | 2 | 2 | 2 |
| | Rust preventive | 0.5 | 0.5 | 0.5 | 0.5 | 0.5 |
| | Li soap | — | 10 | — | 10 | — |
| Friction reducing effect in actual system | | 0 (Reference) | +1.3% | −3.5% | −4.7% | −0.7% |
| Traction coefficient | | 0.018 | 0.019 | 0.018 | 0.018 | 0.018 |
| Evaporation loss by high-temperature thin-film test | | ○ | ○ | ○ | ○ | x |

Wax A: Polyethylene wax (Tradename: LICOWAX PE190 POWDER) made by Clariant Japan K.K.
Wax B: Montan wax (Tradename: LICOWAX OP FLAKES) made by Clariant Japan K.K.
Organic molybdenum: MoDTC (Tradename: MOLYVAN A) made by R. T. VANDERBILT.
Antioxidant: Alkyldiphenylamine (Tradename: IRGANOX L-57) made by BASF.
Rust preventive: Calcium sulfonate (Tradename: LUBRIZOL 1395) made by The Lubrizol Corporation.
Li soap: Lithium 12-hydroxystearate (Tradename: Li-OHST) made by Katsuta Kako Co., Ltd.

<First Embodiment of Reduction Gear Mechanism>

Examples 1-1 to 1-3

The worm wheels were prepared where the tooth surface roughness was optionally varied, and each test grease composition was applied to the tooth surfaces. With the worm and the worm wheel being meshed with each other under the same backlash conditions, the worm wheel of the worm gear was driven to rotate to determine the rotational torque was determined.
(Reduction Gear Mechanisms for the Test)
Worm wheels: injection-molded using glass fiber-reinforced polyamide PA66, and separately processed by gear cutting to have a surface roughness of 0.5 μm, 1.2 μm, and 1.5 μm in terms of the arithmetic mean roughness (Ra).
Worm: made of steel, hardened by heat treatment and then finished by grinding.
Shafts of the worm wheels and the worm: supported by the rolling bearings.
Greases
  Reference grease: prepared in the same manner as in Example 2 except that the hydrocarbon polymer was not used.
  Grease of Example: The grease composition obtained in Example 2 was used.
(Test Conditions)
Ambient temperature: room temperature (25° C.)
Rotational speeds: 4, 10, 15 $min^{-1}$
The test conditions are shown in Table 3, and the results are given in Table 3 and FIG. 5.

TABLE 3

| | | Gap between tooth surfaces — | Spring ratio — | Worm gear surface roughness (Ra) (Driving side) μm | Worm wheel surface roughness (Ra) (Driven side) μm | Rotational speed of worm wheel $min^{-1}$ | Rotational torque % | Remarks |
|---|---|---|---|---|---|---|---|---|
| Ref. 1-1 | | Contact of tooth surfaces on both sides (front and | 1.7 | 0.11 | 0.5 | 4 | 100.0 | The torque obtained at the worm wheel rotational speed of 4 $min^{-1}$ in Reference 1-1 |
| | | | | | | 10 | 106.9 | |
| | | | | | | 15 | 111.2 | |

TABLE 3-continued

| | | Gap between tooth surfaces — | Spring ratio — | Worm gear surface roughness (Ra) (Driving side) μm | Worm wheel surface roughness (Ra) (Driven side) μm | Rotational speed of worm wheel min$^{-1}$ | Rotational torque % | Remarks |
|---|---|---|---|---|---|---|---|---|
| Ex. 1-1 | back sides) | | | | | 4 | 85.1 | was supposed to be 100%. |
| | | | | | | 10 | 97.2 | |
| | | | | | | 15 | 111.1 | |
| Ref. 1-2 | Contact of tooth surfaces on both sides (front and | 1.7 | 0.11 | 1.2 | 4 | 100.0 | The torque obtained at the worm wheel rotational speed of 4 min$^{-1}$ in Reference 1-2 |
| | | | | | | 10 | 111.2 | |
| | | | | | | 15 | 111.2 | |
| Ex. 1-2 | back sides) | | | | | 4 | 89.7 | was supposed to be 100%. |
| | | | | | | 10 | 103.8 | |
| | | | | | | 15 | 103.8 | |
| Ref. 1-3 | Contact of tooth surfaces on both sides (front and | 1.7 | 0.11 | 1.5 | 4 | 100.0 | The torque obtained at the worm wheel rotational speed of 4 min$^{-1}$ in Reference 1-3 |
| | | | | | | 10 | 114.5 | |
| | | | | | | 15 | 121.0 | |
| Ex. 1-3 | back sides) | | | | | 4 | 88.9 | was supposed to be 100%. |
| | | | | | | 10 | 101.4 | |
| | | | | | | 15 | 108.9 | |

The spring ratio obtained at the rotational torque of 100% in Reference 3-1 was supposed to be 1.

Figure 5:
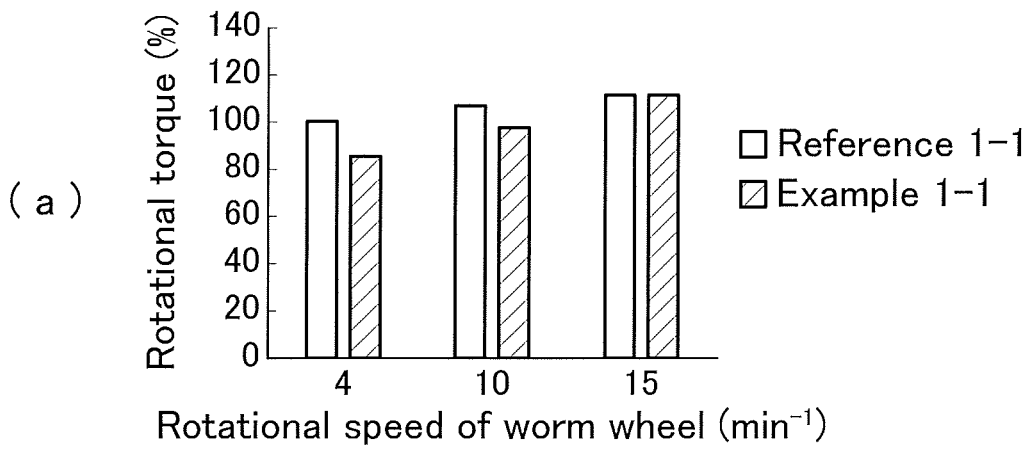
FIG. 5 shows the test results about the rotational torque in Examples 1-1 to 1-3.
Figure 5:
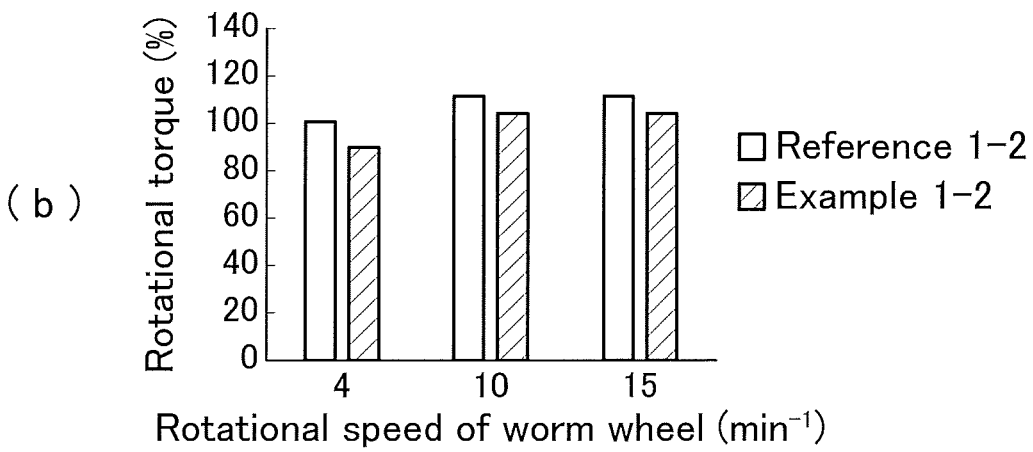
Figure 5:
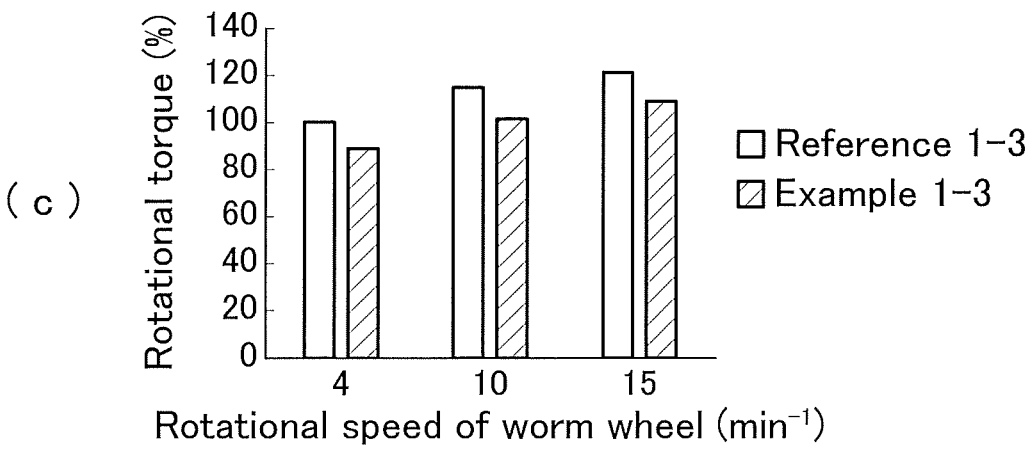

As shown in Table 3 and FIG. 5, the rotational torque of the reduction gear mechanisms according to Example was found to be lower than that of the reference mechanisms. However, the results are not improved when the surface roughness (Ra) is as low as 0.5 μm, and at the same time, the rotational speed is 15 min$^{-1}$ (FIG. 5(a)). The reason for this is that low surface roughness and high sliding speed of tooth surface become advantageous conditions for the film formation of base oil, so that any grease can create a hydrodynamic lubrication state. In contrast to this, when the speed is low and the surface roughness is high, the effect of reducing the rotational torque is more noticeable. Therefore, when the surface roughness is high and the sliding speed is low, that is, the conditions are disadvantageous to the film formation of base oil, the mechanisms according to Example have been confirmed to exhibit the effect of reducing the rotational torque.

It is possible to obtain the effect of reducing the rotational speed even when the surface roughness (Ra) is 1.5 μm or more although the maximum surface roughness (Ra) of the worm wheel is 1.5 μm in the present test.

Examples 2-1 to 2-3

The worms were prepared where the tooth surface roughness was optionally varied, and each test grease composition was applied to the tooth surfaces. With the worm and the worm wheel being meshed with each other under the same backlash conditions, the worm wheel of the worm gear was driven to rotate to determine the rotational torque.

(Reduction Gear Mechanisms for the Test)

Worms: made of steel, hardened by heat treatment and then finished by grinding. By changing the processing conditions, the worms having a surface roughness of 0.05 μm, 0.11 μm, and 0.22 μm in terms of the arithmetic mean roughness (Ra) were prepared.

Worm wheel: injection-molded using glass fiber-reinforced polyamide PA66, and subjected to gear cutting.

Shafts of the worm wheel and the worms: supported by the rolling bearings.

Greases
  Reference grease: prepared in the same manner as in Example 2 except that the hydrocarbon polymer was not used.
  Grease of Example: The grease composition obtained in Example 2 was used.

(Test Conditions)
Ambient temperature: room temperature (25° C.)
Rotational speeds: 4, 10, 15 min$^{-1}$ The test conditions are shown in Table 4, and the results are given in Table 4 and FIG. 6.

TABLE 4

| | | Gap between tooth surfaces — | Spring ratio — | Worm gear surface roughness (Ra) μm | Worm wheel surface roughness (Ra) μm | Worm wheel min$^{-1}$ | Rotational torque % | Remarks |
|---|---|---|---|---|---|---|---|---|
| Ref. 2-1 | Contact of tooth surfaces on both sides (front and | 1.7 | 0.05 | 1.2 | 4 | 100.0 | The torque obtained at the worm wheel rotational speed of 4 min$^{-1}$ in Reference 2-1 |
| | | | | | | 10 | 118.1 | |
| | | | | | | 15 | 127.3 | |
| Ex. 2-1 | back sides) | | | | | 4 | 89.3 | was supposed to be 100%. |
| | | | | | | 10 | 101.4 | |
| | | | | | | 15 | 111.7 | |
| Ref. 2-2 | Contact of tooth surfaces on both sides (front and | 1.7 | 0.11 | 1.2 | 4 | 100.0 | The torque obtained at the worm wheel rotational speed of 4 min$^{-1}$ in Reference 2-2 |
| | | | | | | 10 | 115.0 | |
| | | | | | | 15 | 122.8 | |
| Ex. 2-2 | back sides) | | | | | 4 | 88.3 | was supposed to be 100%. |
| | | | | | | 10 | 101.3 | |
| | | | | | | 15 | 111.9 | |
| Ref. 2-3 | Contact of tooth surfaces on both sides (front and | 1.7 | 0.22 | 1.2 | 4 | 100.0 | The torque obtained at the worm wheel rotational speed of 4 min$^{-1}$ in Reference 2-3 |
| | | | | | | 10 | 108.4 | |
| | | | | | | 15 | 108.4 | |

| | Gap between tooth surfaces — | Spring ratio — | Worm gear surface roughness (Ra) (Driving side) μm | Wheel surface roughness (Ra) (Driven side) μm | Rotational speed of worm wheel min$^{-1}$ | Rotational torque % | Remarks |
|---|---|---|---|---|---|---|---|
| Ex. 2-3 | back sides) | | | | 4 | 82.1 | was supposed to be 100%. |
| | | | | | 10 | 88.6 | |
| | | | | | 15 | 96.2 | |

The spring ratio obtained at the rotational torque of 100% in Reference 3-1 was supposed to be 1.

Figure 6:
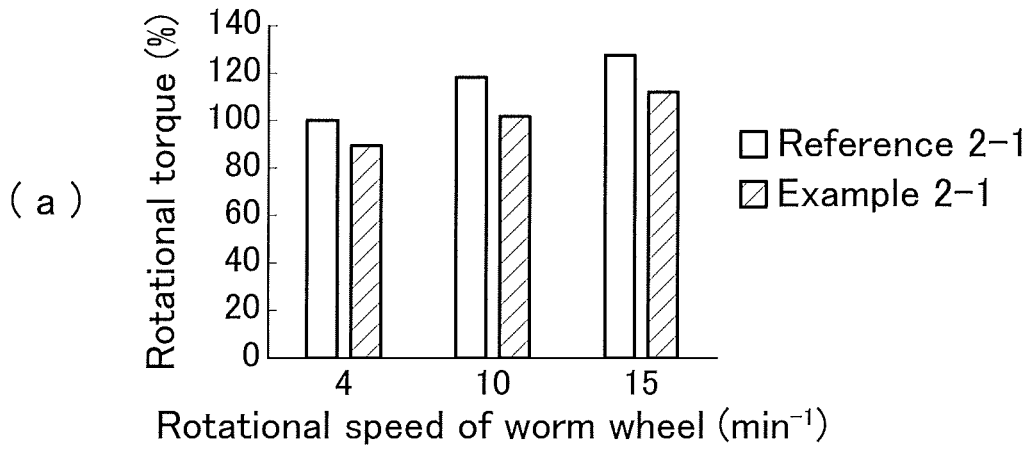
FIG. 6 shows the test results about the rotational torque in Examples 2-1 to 2-3.
Figure 6:
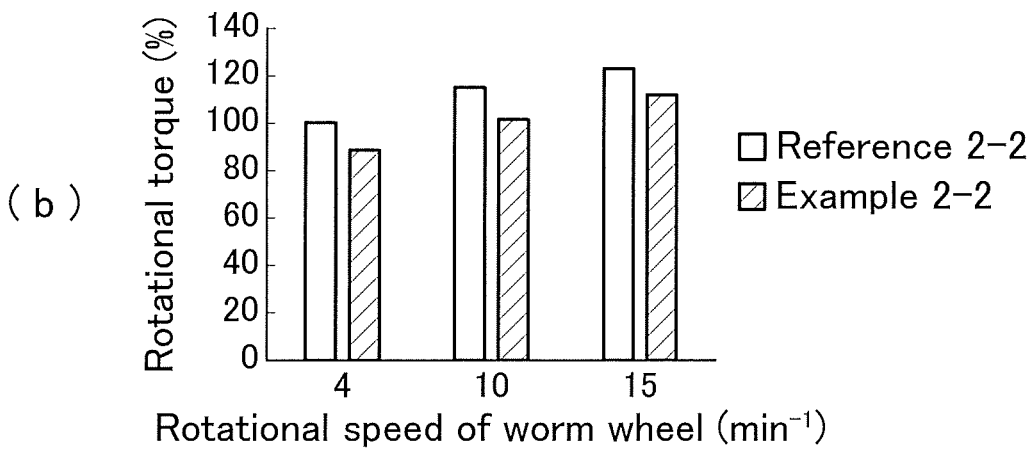
Figure 6:
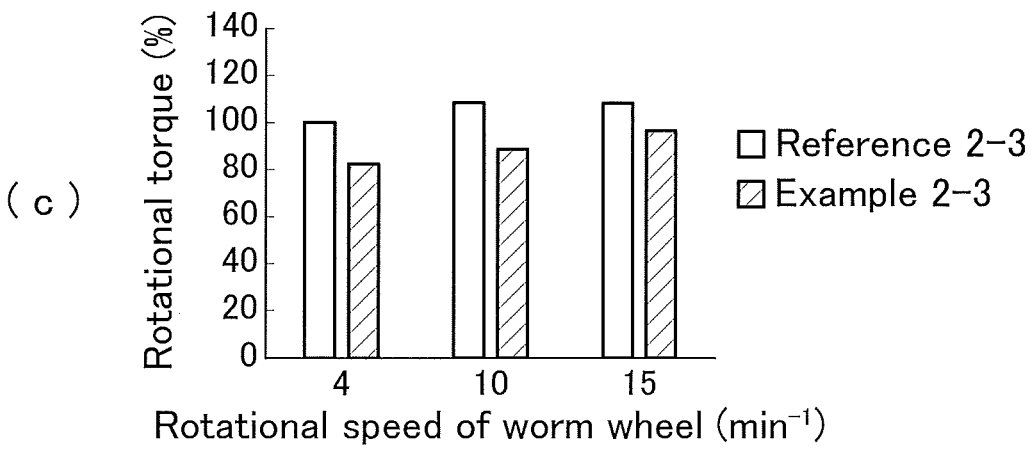

As shown in FIG. 6, the reduction gear mechanisms according to Example were found to offer lower rotational torque than the reference mechanisms under all the conditions. The effect of reducing the rotational torque is more noticeable when the rotational speed is low and the surface roughness is high. On the other hand, as the rotational speed becomes higher and the surface roughness becomes lower, the effect of reducing the rotational torque becomes less noticeable although it is observed.

The above-mentioned results are the same as those in Examples 1-1 to 1-3. Namely, the low surface roughness and high sliding speed of tooth surface become advantageous conditions for the film formation of base oil, so that the effect of reducing the rotational torque becomes less noticeable. In contrast to this, when the surface roughness is high and the sliding sped is low, in other words, the conditions are disadvantageous to film formation of base oil, the reduction gear mechanisms according to Example are found to sufficiently exhibit the effect of reducing the rotational torque.

As can be seen from the above results, the reduction gear mechanisms of Example are found to improve the lubrication performance under the conditions disadvantageous to the film formation, that is, under the conditions of high surface roughness and low sliding speed.

grease of Example were separately applied. By driving the worm wheel shaft to rotate, the rotational torque was determined.

(Reduction Gear Mechanisms for the Test)
Springs: 1.0, 1.3, 1.7 and 2.0 (expressed by the ratio to 1.0, and the larger the value, the higher the load.)
Worm wheel: injection-molded using glass fiber-reinforced polyamide PA66, and subjected to gear cutting to form tooth surfaces.
Worm: made of steel, hardened by heat treatment and then finished by grinding.
Shafts of the worm wheel and the worm: supported by the rolling bearings.
Greases
    Reference grease: prepared in the same manner as in Example 2 except that the hydrocarbon polymer was not used.
    Grease of Example: The grease composition obtained in Example 2 was used.
(Test Conditions)
Ambient temperature: room temperature (25° C.)
Rotational speed: 4 min$^{-1}$ The test conditions are shown in Table 5, and the results are given in Table 5 and FIG. 7.

TABLE 5

| | | Gap between tooth surfaces — | Spring ratio — | Worm gear surface roughness (Ra) (Driving side) μm | Wheel surface roughness (Ra) (Driven side) μm | Rotational speed of worm wheel min$^{-1}$ | Rotational torque % | Remarks |
|---|---|---|---|---|---|---|---|---|
| Ref. 3-1 | Contact of tooth surfaces on both sides (front and back sides) | | 1 | 0.11 | 1.2 | 4 | 100.0 | The torque obtained at the spring ratio of 1 in Reference 3-1 was supposed to be 100%. |
| Ex. 3-1 | | | | | | | 79.7 | |
| Ref. 3-1 | | | 1.3 | | | | 121.1 | |
| Ex. 3-1 | | | | | | | 100.3 | |
| Ref. 3-1 | | | 1.7 | | | | 135.4 | |
| Ex. 3-1 | | | | | | | 101.7 | |
| Ref. 3-1 | | | 2 | | | | 164.0 | |
| Ex. 3-1 | | | | | | | 129.3 | |

It is possible to obtain the effect of reducing the rotational speed even when the surface roughness (Ra) is 0.22 μm or more although the maximum surface roughness (Ra) of the worm is 0.22 μm in the present test.

<Second Embodiment of Reduction Gear Mechanism>

Example 3-1

Figure 7:
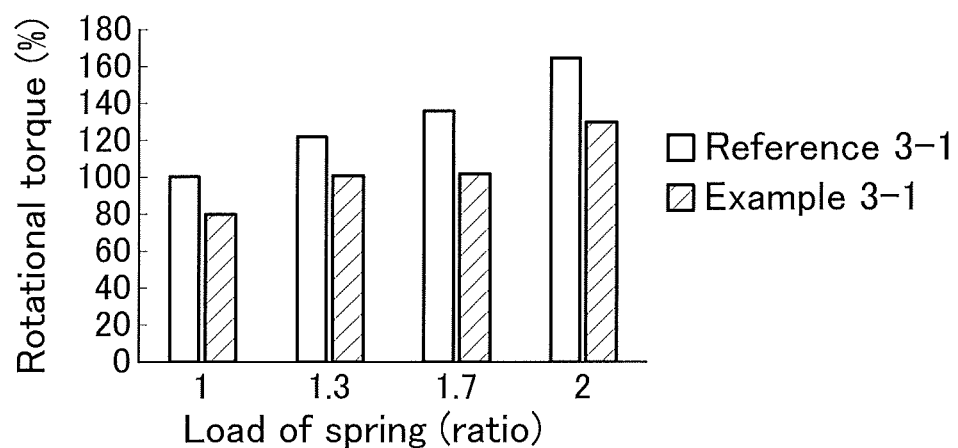
FIG. 7 shows the test results about the rotational torque in Example 3-1.

The load of the spring (i.e., an element of the urging mechanism for urging the worm toward the worm wheel, for example, the urging means 424 as shown in FIG. 4) was changed to four levels. For each load level, two reduction gear mechanisms were assembled so that the load was adjusted to the same level, and the reference grease and the As shown in FIG. 7, it is confirmed that the rotational torque becomes lower in the reduction gear mechanism of Example 3-1 than that of Reference 3-1 in any case.

Example 4-1

The reduction gear mechanisms were each provided with a gear box capable of adjusting the distance between the shafts of the worm and the worm wheel, and separately coated with a reference grease and a grease of Example. The backlash was changed by adjusting the distance between the shafts. By driving the worm wheel shaft to rotate, the rotational torque was determined.

(Reduction Gear Mechanisms for the Test)
Worm wheel: injection-molded using glass fiber-reinforced polyamide PA66, and subjected to gear cutting to form tooth surfaces.
Worm: made of steel, hardened by heat treatment and then finished by grinding.
Shafts of the worm wheel and the worm: supported by the rolling bearings.
Greases
  Reference grease: prepared in the same manner as in Example 2 except that the hydrocarbon polymer was not used.
  Grease of Example: The grease composition obtained in Example 2 was used.
(Test Conditions)
Ambient temperature: room temperature (25° C.)
Rotational speed: 4 min$^{-1}$
The test conditions are shown in Table 6, and the results are given in Table 6 and FIG. 8.

TABLE 6

| Worm gear surface roughness (Ra) | μm | 0.11 |
|---|---|---|
| Wheel surface roughness (Ra) | μm | 1.2 |
| Rotational speed of worm wheel | min$^{-1}$ | 4 |

| Reference 4-1 | | | Example 4-1 | | |
|---|---|---|---|---|---|
| Backlash Ratio | Rotational torque % | Gap between tooth surfaces | Backlash Ratio | Rotational torque % | Gap between tooth surfaces |
| 1.09 | 97.6 | Tooth surfaces do not touch at both sides (front and back sides). | 1.12 | 88.8 | Tooth surfaces do not touch at both sides (front and back sides). |
| 1.06 | 101.1 | | 1.06 | 103.2 | |
| 0.87 | 141.5 | Contact of tooth surfaces on both sides (front and back sides) | 1.02 | 97.4 | |
| 0.85 | 149.3 | | 0.93 | 118.1 | Contact of tooth surfaces on both sides (front and back sides) |
| 0.68 | 234.1 | | 0.74 | 171.7 | |
| 0.67 | 244.3 | | 0.74 | 151.2 | |
| 0.58 | 300.2 | | 0.65 | 194.1 | |
| 0.56 | 282.4 | | 0.65 | 204.0 | |
| 0.51 | 318.7 | | 0.59 | 230.3 | |
| 0.47 | 349.3 | | 0.57 | 248.9 | |
| 0.46 | 369.6 | | 0.52 | 270.8 | |
| 0.43 | 423.7 | | 0.48 | 292.2 | |
| 0.42 | 374.7 | | 0.46 | 328.0 | |
| 0.36 | 439.9 | | 0.41 | 343.3 | |
| 0.35 | 502.8 | | 0.39 | 397.0 | |
| 0.31 | 518.3 | | 0.35 | 418.5 | |
| 0.28 | 562.4 | | 0.34 | 455.4 | |
| 0.28 | 553.6 | | 0.31 | 461.2 | |
| 0.22 | 649.6 | | 0.26 | 538.5 | |
| 0.16 | 652.8 | | 0.22 | 561.8 | |
| 0.15 | 744.4 | | 0.17 | 611.0 | |
| 0.15 | 739.5 | | 0.16 | 630.2 | |

When the shaft-to-shaft distance attains to the stage where opposite tooth surfaces are about to touch (zero touch), the backlash was supposed to be 1.
The rotational torque obtained at the backlash of 1 in Reference 4-1 was supposed to be 100%.

Figure 8:
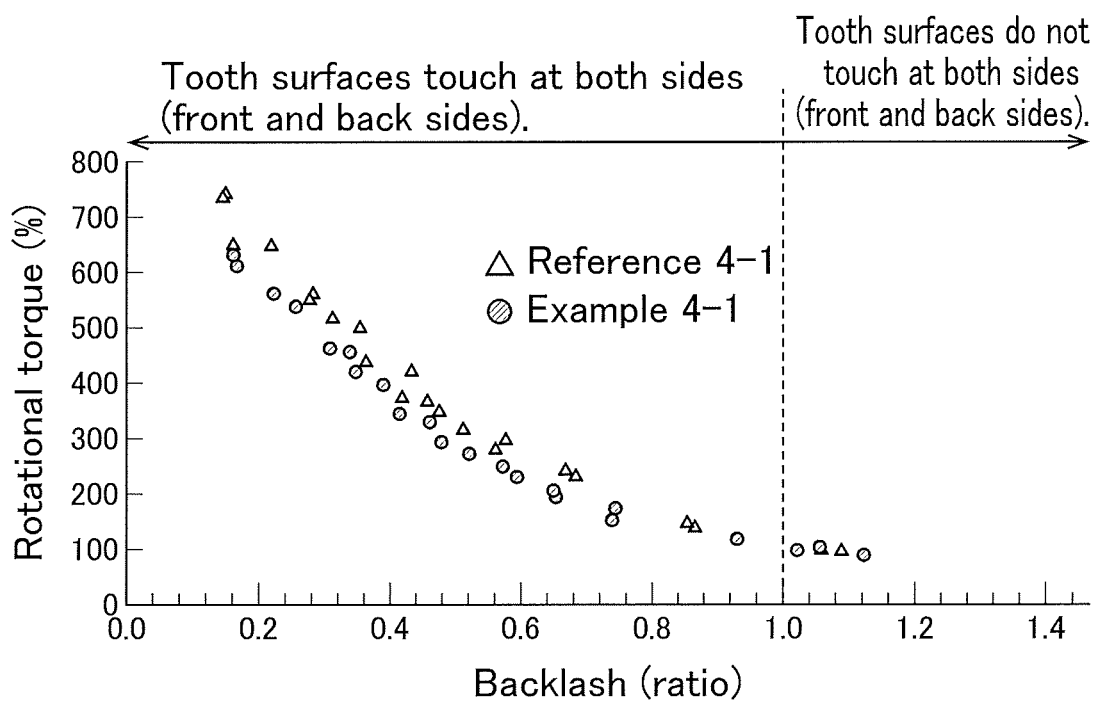
FIG. 8 shows the test results about the rotational torque in Example 4-1.

As shown in FIG. 8, it is confirmed that the rotational torque becomes lower in the reduction gear mechanism of Example than in the reference mechanism. However, the results are equal in both mechanisms when the backlash is large. When the backlash is large, a gap is produced between the engaged tooth surfaces. Namely, the engaged tooth surfaces are brought into direct contact with each other only on the front side with respect to the transmission direction of rotation, so that the load applied to the tooth surfaces is reduced. Therefore, the state of hydrodynamic lubrication is formed where the backlash is large, which consequently makes the rotational torque in the reference mechanism 4-1 equal to that in the mechanism of Example 4-1.

In contrast to the above, when the backlash is small, the engaged tooth surfaces are brought into direct contact with each other on both sides with respect to the transmission direction of rotation, and the load urged toward the tooth surface is additionally applied. Therefore, the hydrocarbon polymer can act via the base oil on the direct contact portions resulting from the surface roughness of the tooth surface, so that the effect of reducing the rotational torque can be recognized in the mechanism of Example 4-1, but not recognized in the mechanism of Reference 4-1.

By the way, the reason why the backlash is decreasing even after the engaged tooth surfaces come in contact with each other with no gap between them is that the tooth surfaces are deformed. In particular, resin is more flexible and therefore more susceptible to deformation than metal.

As can be seen from the above-mentioned results, it has been confirmed that the force of friction can be prevented from increasing, with the gear rattling noise being reduced in the above-mentioned Examples where the backlash of the reduction gear is decreased to eliminate the gap between the tooth surfaces.

The invention claimed is:
1. A grease composition for lubricating resins, comprising;
   60 to 90 mass % of a base oil having a kinematic viscosity at 40° C. of 15 to 200 mm$^2$/s,
   5 to 25 mass % of, as a thickener, a diurea compound represented by formula (I):

wherein R$^2$ represents a bivalent aromatic hydrocarbon group having 6 to 15 carbon atoms, and R$^1$ and R$^3$ each independently represent a straight-chain or branched alkyl group having 8 to 22 carbon atoms, and 0.1 to 4 mass % of a chained hydrocarbon polymer having a weight-average molecular weight of 200,000 to 300,000, wherein the base oil comprises poly-alpha-olefin, the chained hydrocarbon polymer is unsubstituted or substituted ethylene propylene copolymers or unsubstituted or substituted polyisoprenes, the kinematic viscosity of a mixture of the base oil and the chained hydrocarbon polymer is in the range of 80 to 280 mm$^2$/s at 40° C., and wherein all mass percents are based on the total mass of the composition.

2. The grease composition for lubricating resins of claim 1, further comprising a wax consisting of a polyolefin wax and a montan wax, with the content of the polyolefin wax being 3 mass % or more based on the total mass of the composition, the content of the montan wax being 2 mass % or more based on the total mass of the composition, and the sum of the polyolefin wax and the montan wax being 10 mass % or less based on the total mass of the composition.

3. The grease composition for lubricating resins of claim 1, which is used for lubricating between a resin member and a metal member.

4. The grease composition for lubricating resins of claim 3, wherein the lubrication between the resin member and the metal member is a rolling-sliding lubrication.

5. A reduction gear mechanism designed as a power transmission mechanism for transmitting an output torque of a motor to a shaft as an assist torque, comprising a driving gear made of a metal and connected to the motor and a driven gear made of a resin composition, wherein the driven gear has a tooth surface roughness of 0.5 μm or more in terms of the arithmetic mean roughness (Ra) and the metal driving gear and the resin driven gear are lubricated with the grease composition of claim 4.

6. The reduction gear mechanism of claim 5, wherein tooth surfaces of the metal driving gear are brought into contact with tooth surface of the resin driven gear both on the front side facing a transmission direction of rotation and on the back side facing a direction opposite to the transmission direction of rotation.

7. An electric power steering device which uses the reduction gear mechanism of claim 6.

8. The grease composition for lubricating resins of claim 1, wherein the chained hydrocarbon polymer is an unsubstituted or substituted ethylene propylene copolymer.

9. The grease composition for lubricating resins of claim 1, further comprising a wax, an antioxidant and a rust inhibitor.

* * * * *